Aug. 6, 1929.    G. J. HOLANBEK    1,723,237
BACK-UP STOP FOR TRAILERS
Filed April 5, 1927    3 Sheets-Sheet 3

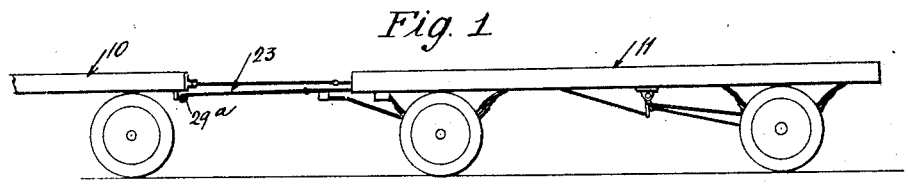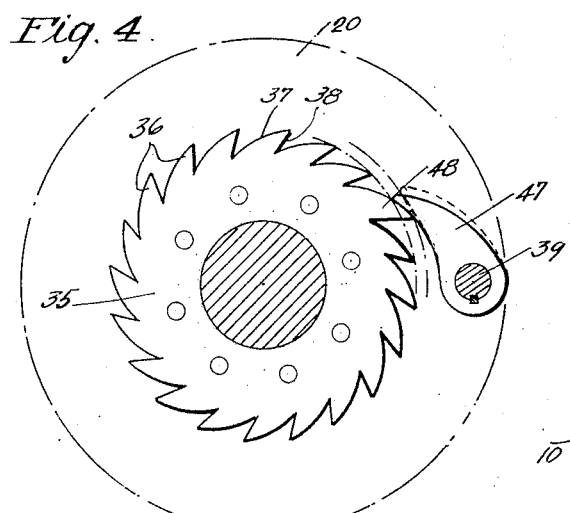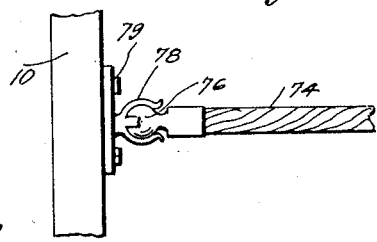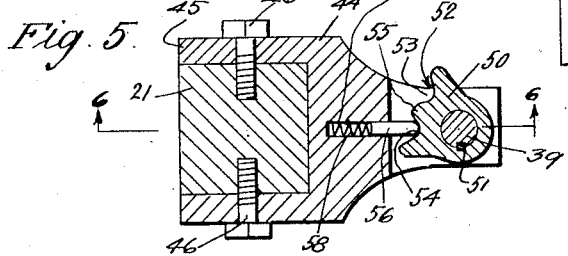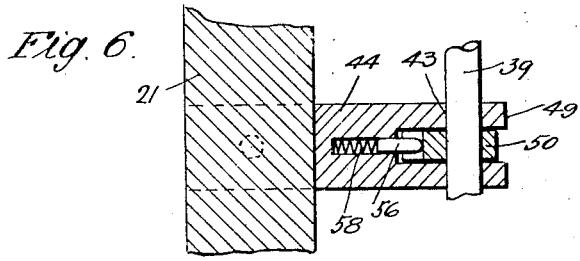

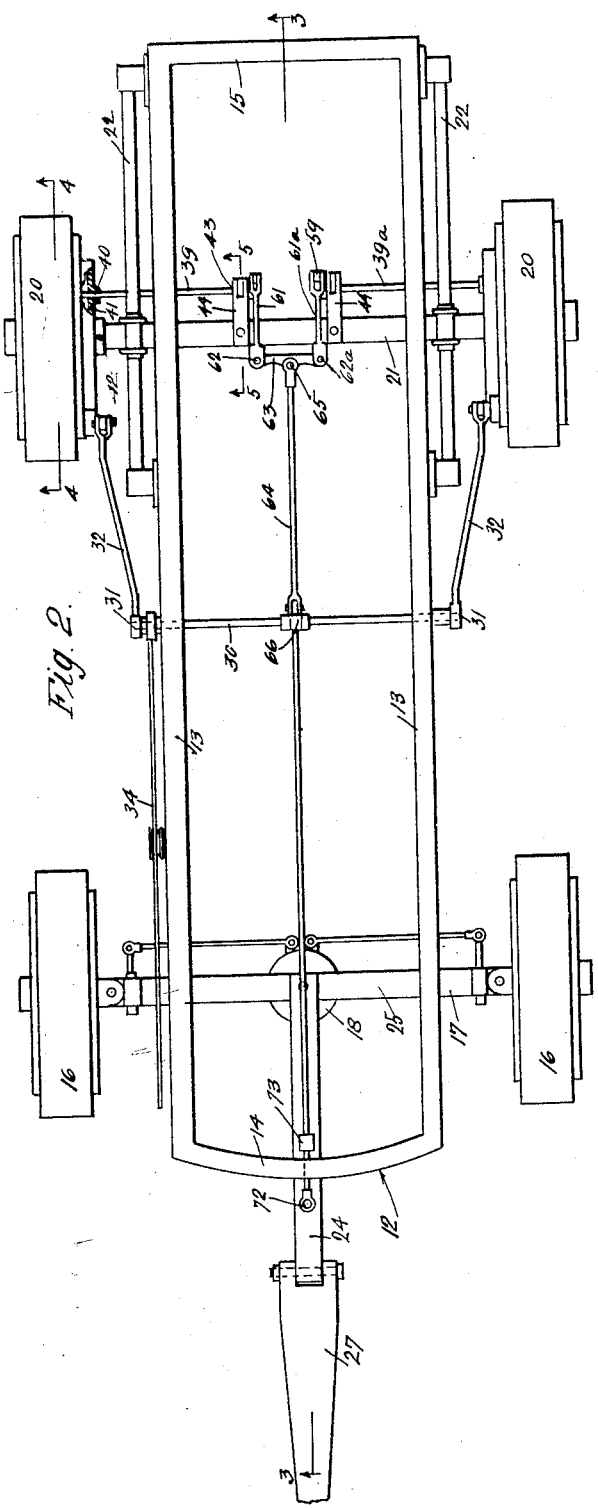
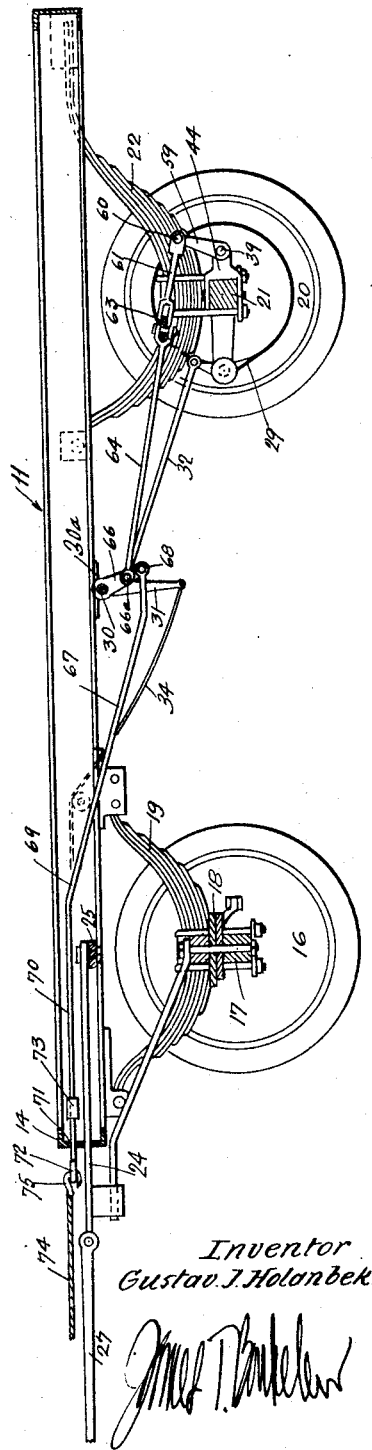

Inventor
Gustov J. Holanbek.

Attorney.

Patented Aug. 6, 1929.

1,723,237

UNITED STATES PATENT OFFICE.

GUSTAV J. HOLANBEK, OF LOS ANGELES, CALIFORNIA, ASSIGNOR OF ONE-HALF TO FRED W. CARNES, OF LOS ANGELES, CALIFORNIA.

BACK-UP STOP FOR TRAILERS.

Application filed April 5, 1927. Serial No. 181,243.

This invention has to do generally with means for opposing motion of a vehicle in a given direction, and is more particularly concerned with such means as applied to trailers adapted to be drawn by leading or towing vehicles.

While this is not controlling on the invention, considered in its broader aspects, I have here shown and will describe my motion-opposing means as applied to a trailer in a manner to oppose its rearward or back-up movement. Also, as a preferred but not a limitative characteristic, the motion opposing means is adapted, when in operative condition, positively to stop the trailer from rearward movement, this positive stop-means here being indicated as embodying a ratchet mechanism.

With the above characteristics in mind, a brief discussion of a typical operation will serve to make apparent the general nature and objects of the invention, whereupon it will be evident to those skilled in the art how certain variations, all lying within the scope of my broader claims, may be substituted for the particularities here shown and described.

As is well known, ordinary trailer brakes are controllable entirely from the leading vehicle, the control ordinarily being gained by the use of a flexible connection extending between the leading vehicle and trailer, said connection being applied at one end to the trailer brakes and at the other end to a control handle mounted for oscillation on the leading vehicle. In the event the draft connection between the leading vehicle and the trailer fails, all control over the trailer is lost. Assume, for instance, that the trailer is being drawn up a grade, at which time, of course, the draft connection is under greatest stress. In the event the draft connection breaks, control over the trailer is lost with the result that the trailer is free to roll backwards with an almost positive assurance of wreckage or damage to itself and whatever may lie in its path.

My motion opposing means is adapted to act automatically upon the occurrence of such a break in the draft connection, preventing other than extremely limited retrogression of the trailer. This automatic actuation of the checking or holding means is brought about by virtue of the relative separative movement between the leading vehicle and trailer; but the discussion of the means for accomplishing this may better be incorporated in the following detailed description.

My device has a further feature in that it is automatically released when the leading vehicle is driven ahead after it has been recoupled to the trailer. In other words, assuming a break in the draft connection has occurred and the trailer has consequently been held by my device against retrogression, as soon as the draft connection has been re-established, the operator need pay no attention to the back-up stop but need merely drive ahead, since the back-up stop is automatically released upon advance of the trailer. This releasing of the back-up stop is also in the nature of a resetting thereof, for it is then in such condition that if a break in the draft connection occur after such release, the back-up stop again automatically becomes set or takes hold.

Other features of novelty and objects of the invention will be made apparent in the following detailed description, reference being had to the accompanying drawings, in which:

Fig. 1 is a side elevation showing an embodiment of my invention applied to a towed trailer;

Fig. 2 is an enlarged, detached view of a trailer equipped with an embodiment of my device;

Fig. 3 is a section, partially in elevation on line 3—3 of Fig. 2;

Fig. 4 is an enlarged, fragmentary section on line 4—4 of Fig. 2;

Fig. 5 is an enlarged section on line 5—5 of Fig. 2;

Fig. 6 is a section on line 6—6 of Fig. 5;

Fig. 7 is an enlarged fragmentary detail showing a preferred type of connection between the leading vehicle and the control or tension member of the stop mechanism;

Figure 8:
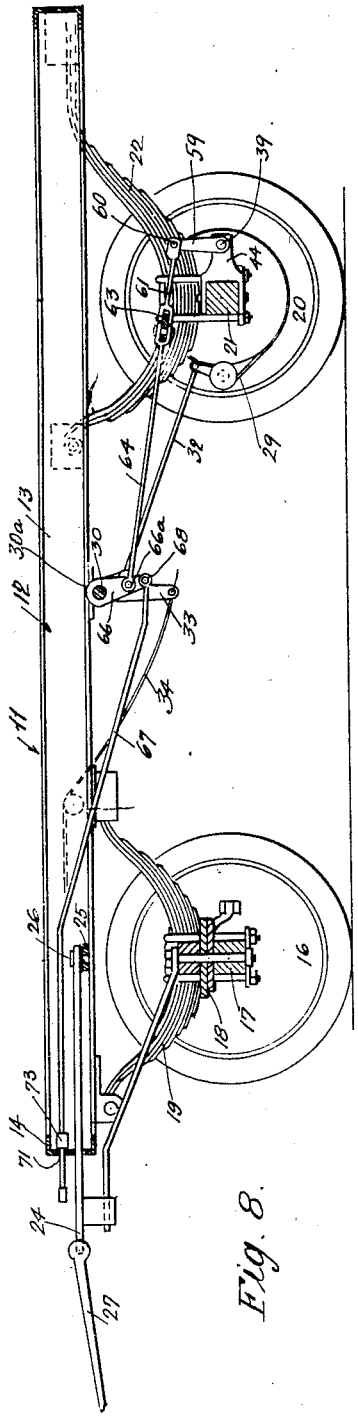
Fig. 8 is a view similar to Fig. 3, but showing the stop mechanism in operative position.

As above stated, I have here shown a positively acting motion-opposing mechanism applied to a trailer in a manner to prevent its rearward movement under certain conditions, but it is repeated that this is merely a preferred embodiment of the invention and is not limitative on it, as broadly viewed.

I have indicated at 10 a leading or towing vehicle, and at 11 a trailer adapted to be towed thereby. While the make-up of the trailer is unessential to the present invention, I have here shown a typical trailer construction including a frame 12, made up of side rails 13 and forward and rearward end members or channels 14, 15 respectively.

Forward or dirigible wheels 16 are connected through axle 17, fifth wheel device 18, and springs 19 to frame 12. Rearward wheels 20 are connected to frame 12 through axle 21 and springs 22, the axle here being shown as "dead" and the wheels being mounted for independent rotation thereon, though this is not essential to the invention.

The draft connection generally indicated at 23 between vehicles 10 and 11, may be of any suitable character. I have here shown it as including a draw bar 24 applied to the cross member 25 of frame 12 at 26. The bar carries a tongue 27 which is pivotally connected thereto for movement about a horizontal axis, and is adapted to be releasably coupled at 29ª to leading vehicle 10.

While the type and operation of the usual trailer brakes are not important to this invention, I have here conventionally illustrated such brakes 29 as applied to wheels 20. Journaled to rails 13 at 30ª is a cross or rock-shaft 30 carrying at its opposite extremities cranks 31 which are connected to brake-actuating links 32, the latter being applied to brake mechanisms 29 in the usual manner. Shaft 30 also carries crank 33 from which extends a control cable 34, the latter leading to vehicle 10 in a manner to be controlled therefrom. The connection between cable 34 and the control or operating means on the vehicle 10 is not shown here since it may be of any usual type and its particularities are not controlling on the present invention.

The two rear wheels 20 are preferably supplied with individual back-up stops, and since these stops may be identical, I will describe but one in detail. Applied to one of the wheels 20 so as to rotate concentrically therewith is a ratchet wheel 35, the individual teeth having cam faces 37 and stop shoulders 38. An operating or rock-shaft 39 is arranged in parallelism with axle 21, being journaled for oscillation near one end 40 in the plate 41 which is held to the axle and against rotation at 42, while the other end of the rock-shaft is journaled at 43 in bracket or supporting member 44 which is preferably in the form of a casting having a forked end 45 adapted to take axle 21 as in Fig. 5, the bracket being secured to said axle by bolts 46.

Figure 9:
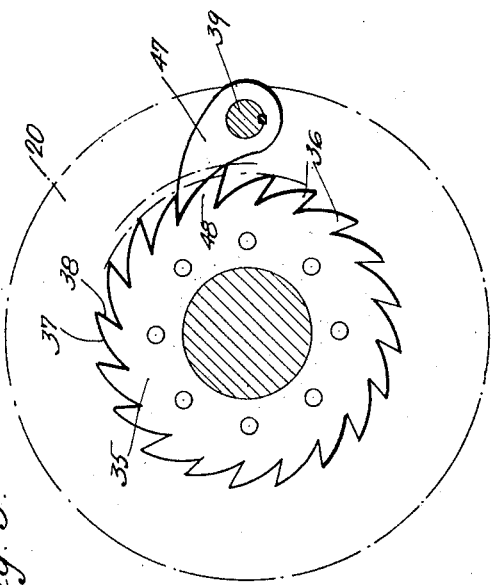
Fig. 9 is a view similar to Fig. 4 but showing the stop pawl in fully operative position.

Keyed to shaft 39 and positioned in the plane of ratchet wheel 35 is a dog or pawl 47, said dog being adapted to be oscillated by angular movement of shaft 39 from the dotted line position of Fig. 4 to that of Fig. 9, in which latter position it is adapted to engage one of the tooth shoulders 38 in a manner to prevent rotation of the ratchet wheel 35 and hence of wheel 20 in a clockwise direction (as viewed in Fig. 9) thereby to prevent rearward movement of the trailer.

For a purpose which will hereinafter be made apparent, one ratchet tooth 48 may be of greater length than the remaining teeth 36, though this provision is not essential to operation.

The rearward end of bracket 44 preferably is forked as shown in Fig. 6, shaft 39 extending through fork arms 49 and carrying positioning cam 50 between said arms. This cam is keyed at 51 to the shaft and its forward cam face 52 preferably has angularly spaced recesses 53 and 54 with a central, rounded nose 55 between them. A spring-pressed detent, conveniently made up of a plunger 56 adapted to slide longitudinally through bracket bore 57 and yieldably pressed by spring 58 to the right, as viewed in Fig. 5, is positioned so as to enter notch or recess 54 when pawl 47 is in the dotted line position of Fig. 4 and to enter notch or recess 53 when shaft 39 has been rotated to carry pawl 47 into the position of Fig. 9, it being apparent that the detent rides over nose 55 as the cam is oscillated from one position to the other.

Applied to the inner end of shaft 39 is an upstanding crank arm 59, which is pivotally connected at 60 to a link 61, the latter being pivotally connected at 62 to one end of equalizer bar 63. A link 61ª, similar to link 61 and applied to rock-shaft 39ª of the stop mechanism associated with the opposite wheel 20, is pivotally connected at 62ª to the other end of bar 63. A drag link 64 is pivotally applied at 65 to bar 63, the connection btween said link and bar being at a point midway between pivotal connections 62, 62ª. The forward end of link 64 is pivotally connected at 66ª to crank 66, said crank being mounted for rotation about shaft 30. A draft link or rod 67 is pivotally connected at 68 to crank 66, preferably at a point below the pivotal connection 66ª, and extends upwardly and rearwardly at 69 and thence substantially horizontally at 70 through an aperture 71 in end-rail 14, the link terminating in an eye 72 at a point forward of the rail. Preferably, though not necessarily, a stop collar 73 is carried by the horizontal portion of rod 67, said collar being horizontally spaced from rail 14 when the stop mechanism is in release or inoperative position.

While the connection between draft rod 67 and leading vehicle 10 may be of any suitable nature, preferably it is flexible, being here shown in the form of a cable 74 having at one end a hook 75 for releasable connection with eye 72, and having at the other end a ball 76 adapted to be snapped into releasable connection with the spring fingers 78 supported at 79 on vehicle 10. This snap connection is such that cable 74 must be put under considerable predetermined tension before ball 76 is withdrawn from the socket, formed by the fingers, in a manner hereinafter to be described. The cable or controlling tension member 74 is of such effective length that it is normally under no tension, that is, when the draft connection is complete, and preferably has slack in it, for obvious reasons. The snap connection also provides means whereby disconnection between the cable and leading vehicle may be made when the leading vehicle and trailer are to be willfully uncoupled.

In normal or ineffective condition, pawl 47 is in the dotted line position of Fig. 4, detent 56 engaging notch 54 (Fig. 5) in a manner yieldingly to hold the pawl in this position, while the crank and link assembly is in the condition of Fig. 3. As long as the draft connection 23 is complete, it will be seen that cable 74 is not put under sufficient tension to operate the back-up stop device whether the trailer be drawn forward or backed up, and, consequently, the stop mechanism in no way interferes with normal operation of the trailer, it being evident that the pawl 47 is clear of the ratchet irrespective of the direction of movement of the ratchet.

Now assume that the trailer is being drawn up an incline and that draft connection 23 fails. The trailer immediately tends to move rearwardly, and hence, whether or not the leading vehicle continue in its advance, there is initiated separative movement between the trailer and leading vehicle. Cable 74 is immediately placed under tension, the spring fingers 78 tending to hold cable 74 from detachment from the leading vehicle. Rod 67 is thus momentarily held from longitudinal movement while the trailer is moving rearwardly. This relative longitudinal movement between the trailer and rod 67 may be considered, of course, as movement of the pull rod 67 forwardly with respect to frame 12, the rod thus being moved to the position of Fig. 8. In thus moving, crank 66 is rotated in a clockwise direction, as viewed in Fig. 3, thus drawing link 64, bar 63 and links 61 to the left, as viewed in Fig. 3, and into the position of Fig. 8. This movement swings cranks 59 in a counterclockwise direction, as viewed in Fig. 3, transmitting to shaft 39 and consequently pawls 47 and cams 50 movement in a counterclockwise direction. The pawls are thus brought into engagement with the ratchet wheels 35, engaging tooth shoulders 38 and preventing further clockwise movement of the ratchet wheels and hence of wheels 20, as viewed in Figs. 8 and 9, thus preventing the trailer from moving further to the rear and holding it without attention from the operator until the draft connection has been reestablished. It will be evident that a decided danger is thus eliminated.

Figure 10:
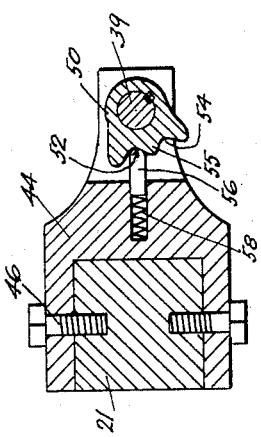
Fig. 10 is a view similar to Fig. 5 but showing the positioning cam shifted to the position it occupies when the stop pawl is in operative position.

With the pawls in the holding position of Fig. 9, cam 50 has been rotated to the position of Fig. 10, whereupon detent 56 rides into notch 52 in a manner releasably to hold the pawls in engaging position.

It will be noted that when the pawl 47 has been thrown to operative position, collar 73 has been brought into engagement with rail 14 (Fig. 8). The longitudinal movement of rod 67 is thus positively limited, so, after the pawl has been fully engaged with the ratchet teeth, any further pull of cable 74 is then taken between rail 41 and collar 73, all mechanism to the rear of said collar being relieved of such strains. With this positive stop, it will be apparent that as soon as the back-up stop mechanism has been fully actuated, further relative movement between the trailer and leading vehicle merely serves to unsnap ball 76 from fingers 78.

It will also be noted that due to the equalizing arrangement, the pawls may be moved independently, that is, if one pawl is riding a tooth of its associated ratchet wheel when rod 67 is actuated, the other pawl is free to move fully into holding engagement with its ratchet wheel. Normally, however, the pawls are moved simultaneously into motion-opposing positions.

When the draft connection between the leading vehicle and the trailer is reestablished, the operator may pull ahead with the trailer without giving further attention to the back-up stop mechanism, other than connecting up cable 74, for said mechanism is automatically released upon forward movement of the trailer. That is, as soon as wheels 20 and hence ratchet wheels 35 are rotated in a counterclockwise direction (as viewed in Figs. 8 and 9), by forward movement of the trailer, the cam faces 37 of the ratchet teeth act against the pawls in a manner to throw them angularly back to a position clearing stop shoulders 39 or the tops of the teeth, cams 50 thus being returned to the position of Fig. 5 and detent 56 re-entering notch 54 in a manner yieldingly to hold the pawls in inoperative position, though it will be evident that said pawls are reset in such condition that subsequent failure of the draft connection will cause a reactuation of the back-up stop mechanism. The full line position of the pawl in Fig. 4 is an intermediate one, such as is occupied when the ratchet wheel is moving the pawl from holding position towards release position.

Now, as stated heretofore, preferably one of the ratchet teeth 48 of each ratchet wheel is of greater effective length than the remaining teeth. By virtue of this provision, it is assured that sufficient angular movement is given to shaft 39 to carry cam 50 past center as said cam is moved from the position of Fig. 10 to that of Fig. 4, or vice versa, or, expressed otherwise, to carry the center of nose 55 past detent 56 in order to insure re-entry of the detent in notch 54. The elongation of this tooth also moves the pawl to such a position that it is well clear of the relatively short teeth and reduces to a minimum the likelihood of the pawl being engaged by the ratchet, during normal backing of the trailer under control of the leading vehicle, in a manner to be moved into holding position.

As soon as the draft connection is re-established, it is, of course, an easy matter to re-engage the ball 76 with the spring fingers 78. If there be sufficient slack in the cable, this re-connection may be made prior to the forward movement of the trailer, though if the cable is not of sufficient length, it will be necessary to wait until forward movement of the trailer has, through angular movement of the pawls and hence shafts 39, returned the crank and link assembly to the positions of Fig. 3. However, the slack left in cable 74 to permit of free relative turning movement of the two vehicles is ordinarily sufficient to allow the ball to be re-engaged by the spring fingers before the pawls have been moved to release position.

It will be understood the drawings and description are to be considered merely as illustrative of and not restrictive on the broader claims appended hereto, for various changes in design, structure and arrangement may be made without departing from the spirit and scope of said claims.

I claim:

1. In combination with a leading vehicle and a trailer coupled thereto, a device on the trailer for opposing motion thereof in a given direction, said device being normally ineffective and being adapted to be actuated to oppose such motion by virtue of relative movement between the leading vehicle and trailer, said device being further adapted to be returned to ineffective condition by virtue of subsequent movement of the trailer in the opposite direction.

2. In combination with a leading vehicle and a trailer coupled thereto, a device on the trailer for opposing motion thereof in a given direction, means yieldably holding the device in ineffective condition, said device being adapted to be actuated against the action of the holding means to oppose such motion by virtue of relative movement between the leading vehicle and trailer, and means yieldably holding the device in motion-opposing condition.

3. In combination with a leading vehicle and a trailer coupled thereto, a ratchet wheel mounted for rotation with one of the wheels of the trailer, a pawl mounted for movement into and out of operative engagement with the ratchet wheel, said pawl, when in operative position, being adapted to hold the ratchet wheel and hence the trailer wheel against rotation in one direction, and means for moving said pawl into operative engagement with the ratchet wheel, said last-named means being operated by virtue of relative movement between the leading vehicle and trailer, and said pawl being adapted to be moved out of operative position by virtue of subsequent movement of the trailer wheel in the opposite direction.

4. In combination with a leading vehicle and a trailer coupled thereto, a ratchet wheel mounted for rotation with one of the wheels of the trailer, a pawl mounted for movement into and out of operative engagement with the ratchet wheel, said pawl, when in operative position, being adapted to hold the ratchet wheel and hence the trailer wheel against rotation in one direction, means for moving said pawl into operative engagement with the ratchet wheel, said last-named means being operated by virtue of relative movement between the leading vehicle and trailer, and said pawl being adapted to be moved out of operative position by virtue of subsequent movement of the trailer wheel in the opposite direction, and means releasably holding said pawl out of operative position after it has been so moved by virtue of such subsequent movement of the trailer wheel.

In witness that I claim the foregoing I have hereunto subscribed my name this 8th day of March, 1927.

GUSTAV J. HOLANBEK.